April 24, 1928.  1,667,568
F. SOMOGYI
INTERCHANGEABLE AGRICULTURAL MACHINE
Filed Oct. 28, 1926   3 Sheets-Sheet 1
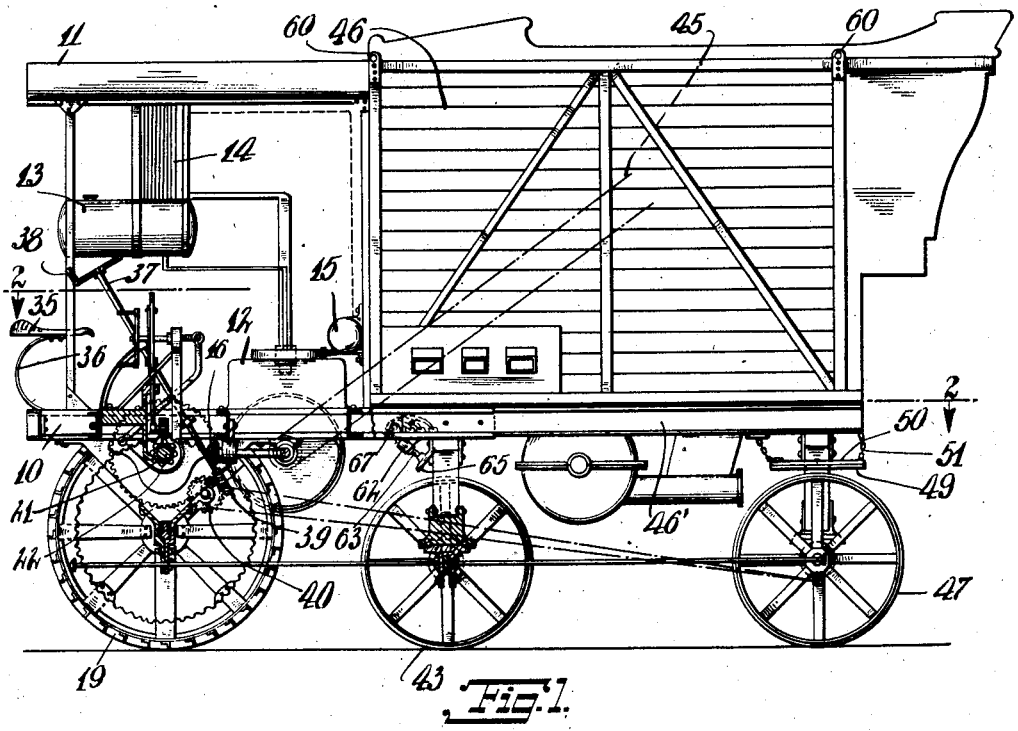

April 24, 1928. 1,667,568
F. SOMOGYI
INTERCHANGEABLE AGRICULTURAL MACHINE
Filed Oct. 28, 1926 3 Sheets-Sheet 2
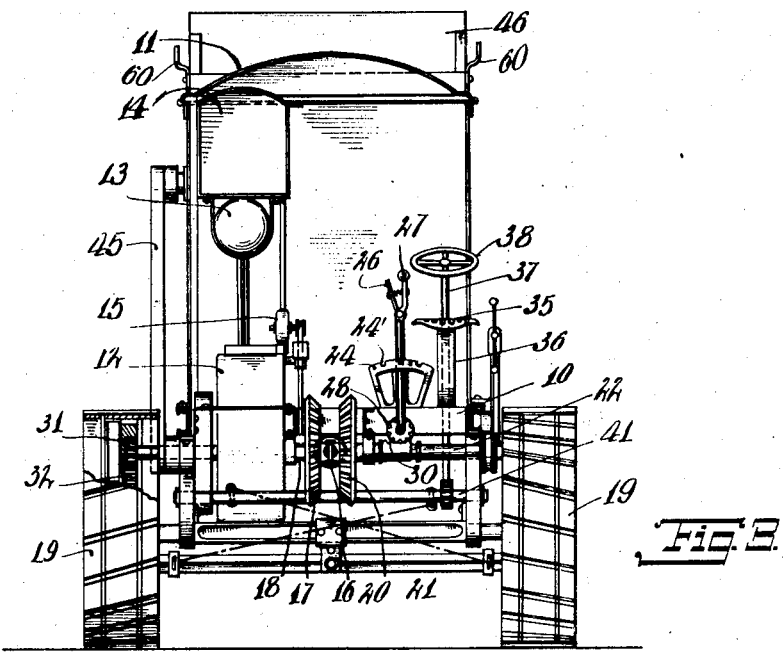
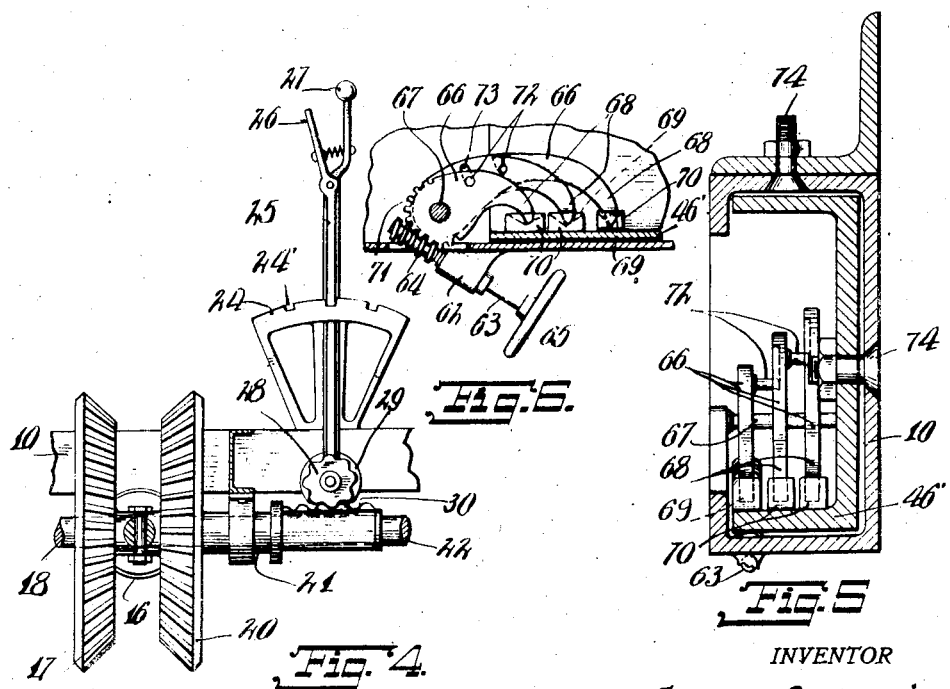
INVENTOR
BY Ferenc Somogyi
ATTORNEY April 24, 1928.

F. SOMOGYI 1,667,568

INTERCHANGEABLE AGRICULTURAL MACHINE

Filed Oct. 28. 1926     3 Sheets-Sheet 3

INVENTOR
BY Ferenc Somogyi
ATTORNEY

Patented Apr. 24, 1928.

1,667,568

UNITED STATES PATENT OFFICE.

FERENC SOMOGYI, OF PARIS, FRANCE.

INTERCHANGEABLE AGRICULTURAL MACHINE.

Application filed October 28, 1926. Serial No. 144,891.

This invention relates to a new and useful device in the nature of an interchangeable agricultural device, being particularly adapted to accommodate different implements and the like, such as are generally required for farming use.

The object of the invention is to provide an interchangeable agricultural device of novel construction and arrangement of parts, hereinafter more fully described, claimed and illustrated in the accompanying drawings, in which:

Fig. 1 shows a side elevational view of my improved interchangeable agricultural device.

Fig. 2 shows a sectional view taken on the line 2—2 of Fig. 1.

Fig. 3 is a front elevational view of my improved device.

Fig. 4 is a detail view of the transmission as embodied in my improved device.

Fig. 5 is an enlarged sectional view taken on the line 5—5 of Fig. 2.

Fig. 6 is a side elevational view, partly in section, of the positioning device as used in connection with my improved interchangeable agricultural device.

Figure 7:
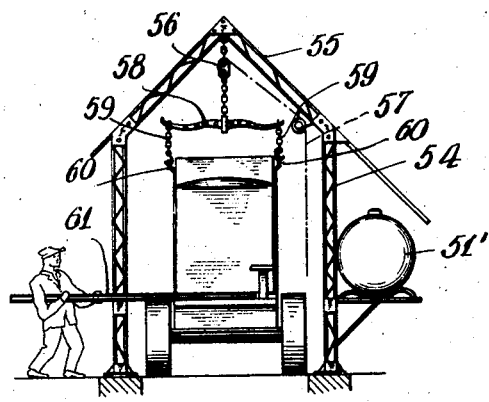
Fig. 7 shows the method employed in removing the interchangeable bodies, as embodied in my improved device.
Figure 8:
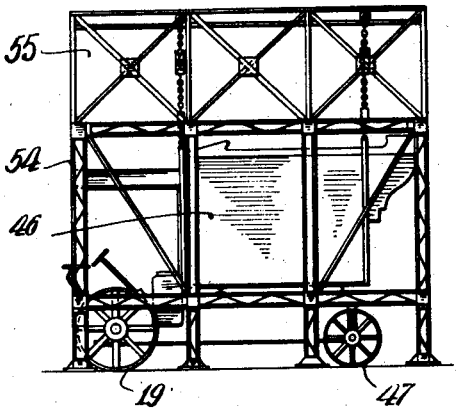
Fig. 8 is a side elevational view thereof.
Figure 9:
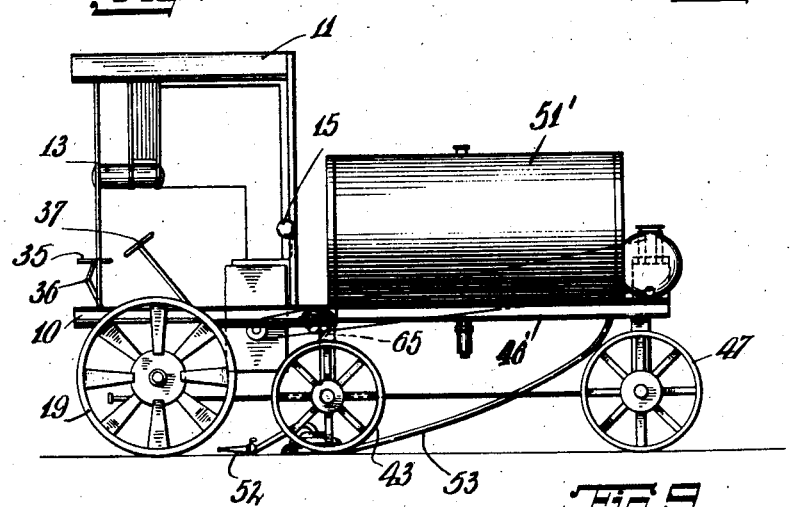
Fig. 9 is a side elevational view showing my improved device equipped with a water tank.
Figure 10:
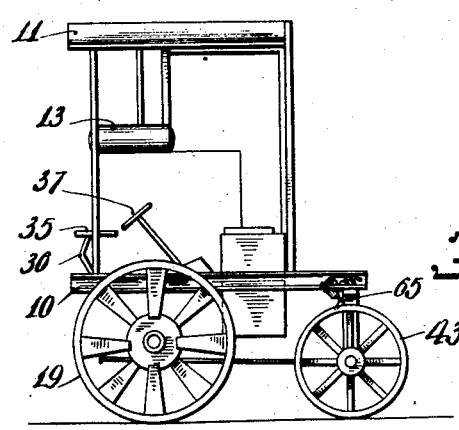
Fig. 10 is a side elevational view of my improved agricultural device proper, showing the interchangeable bodies removed therefrom.

As here embodied my improved device comprises briefly a self propelled vehicle of the tractor type, of comparatively short wheel base, and consisting of a frame 10, upon which is mounted a roof 11, so as to afford the usual shelter. The internal combustion engine 12, is adapted to utilize, gasoline, kerosene, fuel oil, or the like and is provided with the fuel tank 13, radiator 14, and muffler 15, such as commonly used for engines of this type. The said internal combustion engine is operatively connected to the bevel pinion 16, which meshes with the bevel gear 17, attached to the shaft 18, rotatively mounted in the frame 10, and to which is attached the pinion 31 which meshes with the internal gear 32 attached to the road wheel 19 such as commonly used on vehicles of this type. The bevel pinion 20 is attached to the sleeve 21, which is slidably mounted on the shaft 22, to which is attached the pinion 33 which meshes with the internal gear 34 attached to the road wheel 23. The sector 24, is attached to the said frame 10, and is provided with the usual notches 24', adapted to be engaged by the usual pawl 25, which is engaged therewith by the handle 26 attached thereto. The pawl 25 is pivotally attached to the lever 26, provided with the usual handle 27. The engaging member 28, is provided with raised elements 29, adapted to engage the notches formed in the above mentioned sleeve 21. The above described construction being such as will permit the bevel gear 20 to be slidably engaged with the bevel pinion 16, so as to permit the internal combustion engine 12 to rotate the road wheels 19 and 23, so as to propel the said vehicle. The seat 35 is mounted on the flexible member 36, attached to the frame 10. The steering gear 37 is provided with the handle 38, steering wheel or the like, and has attached at its lower extremity a worm 39, meshing with a worm wheel 40 mounted on the usual cross arm 41, which is operatively connected to the front road wheels 47 by chains 48' and 49', as a means of steering my improved device, such as is common to self propelled vehicles of this nature. The chain 48' is disposed over the shaft 41 at its rear end and attached to one side thereof and the chain 49' is attached to the opposite side of said shaft so that rotation of the shaft 41 will cause one chain to be wound on the shaft while the other chain is unwound therefrom. It being understood that the common adjuncts, such as generally employed, are embodied in my improved device. The pulley 44, is attached to the said internal combustion engine. The belt 45 is extended over the pulley 44, and over a second pulley, not shown in the accompanying drawings, as a means of driving any desired mechanism, such as a power saw, for sawing wood or the like, or any desired mechanism adapted to be driven in this manner.

The thrasher 46 comprises the usual thrashing implement, and is embodied or built unto a suitable body or structure which is mounted on the subframe 46', which is removably attached to the hereinbefore mentioned frame 10, as will be hereinafter more fully set forth and described. The road wheels 47, are rotatably mounted on the axle 48 which is attached to the center member 49. The center member 49 is pivotally attached to a similar center member 50 attached to the subframe 46'. The latter described construction being such as will permit the road wheels 47, to pivot as will be limited by the flexible members 51 attached to the subframe 46' and to the center member 49, as will be required to permit my improved device to negotiate turns in the road and the like.

It will be clearly understood that a tank 51', such as may be used to water vegetation, or to transport and spread liquid fertilzer, or the like, through the nozzle 52 attached to the hose 53, which is also attached to the tank 51'.

In Fig. 7, I have illustrated the method of detaching the subframe 46', from the frame 10. The structure 54, or building, is of suitable size to house my improved device, and is provided with the usual roof 55. The pulley 56 is suspended from the roof 55, the flexible member 57 is extended over the pulley 56, and is attached at one extremity to the yoke 58. The flexible members 59, are attached to the extremities of the yoke 58 and have attached at their extended extremities hook shaped members 60, adapted to engage the hereinbefore mentioned body mounted on the subframe 46', as a means of lifting the subframe 46' so as to detach the said subframe, so as to provide an interchangeable device.

Referring in particular to Figs. 5 and 6 of the accompanying drawings in which I have illustrated the method of attaching the subframe 46' to the frame 10. The bracket 62, is attached to the outer extremity of the frame 10, and is adapted to rotatively support the shaft 63, provided with a worm wheel 64, and a hand wheel 65. The pawl members 66 are pivotally mounted on the shaft 67 supported by the frame 10. The pawl members 66 are provided with extended extremities 68, unequally spaced from the shaft 67, the extended extremities 68 are formed or shaped so as to engage in notches 69 of V-shaped construction, formed in block members 70, attached to the subframe 46'. One of the pawl members 66 has formed or cut therein teeth 71 adapted to mesh with the worm wheel 64. The said pawl members have attached thereto and extended therefrom pins 72 or the like, engaging in elongated slots 73, formed in the adjacent pawl member. The latter described construction being such as will position the subframe 46' relative to the frame 10, so as to permit the bolts 74 to be placed on apertures provided in the said subframe and frame as a means of attaching the latter two mentioned members for the purpose as hereinbefore stated.

Having thus described my invention, what I claim as new and desire to protect by Letters Patent of the United States is as follows:

1. In an interchangeable agricultural device of the class described, a vehicle comprising a chassis having spaced openings therein, a body member having openings therein adapted to register with the openings in said chassis, a shaft rigidly mounted on said chassis disposed laterally thereof, a plurality of pawl members rotatively mounted on said shaft, said pawl members being of different lengths and disposed rearwardly in the direction of the rear of said chassis, a plurality of block members having V-shaped grooves therein disposed laterally of said body member at the forward end thereof, pointed extremities on said pawl members adapted to engage in the grooves of said block members, and means comprising a shaft having a worm thereon mounted on said chassis and worm gear teeth meshed therewith on one of said pawl members for rotating the latter to force the pointed extremities into the grooves of said block members for adjusting said body member relative to said chassis for bringing the respective openings therein into registration.

2. In an interchangeable agriculture device of the class described, a chassis frame having spaced openings therein, a shaft rigidly mounted on said chassis frame, a plurality of operatively connected pawl members rotatively mounted on said shaft, teeth on one of the said pawl members, a shaft rotatively mounted on said chassis, a worm on said shaft meshed with the teeth of said pawl member, a body member having openings therein adapted to register with the openings in said chassis frame, blocks on said body member having grooves therein, and extension on said pawl members adapted to engage in said grooves and to be forced therein by rotation of said worm for bringing said body member to a predetermined position on said chassis frame to render the openings therein in registration with the openings of chassis frame.

In testimony whereof I have affixed my signature.

FERENC SOMOGYI.